J. SACHS.
ELECTRIC SWITCH.
APPLICATION FILED DEC. 19, 1916.
1,294,176.
Patented Feb. 11, 1919.
3 SHEETS—SHEET 1.
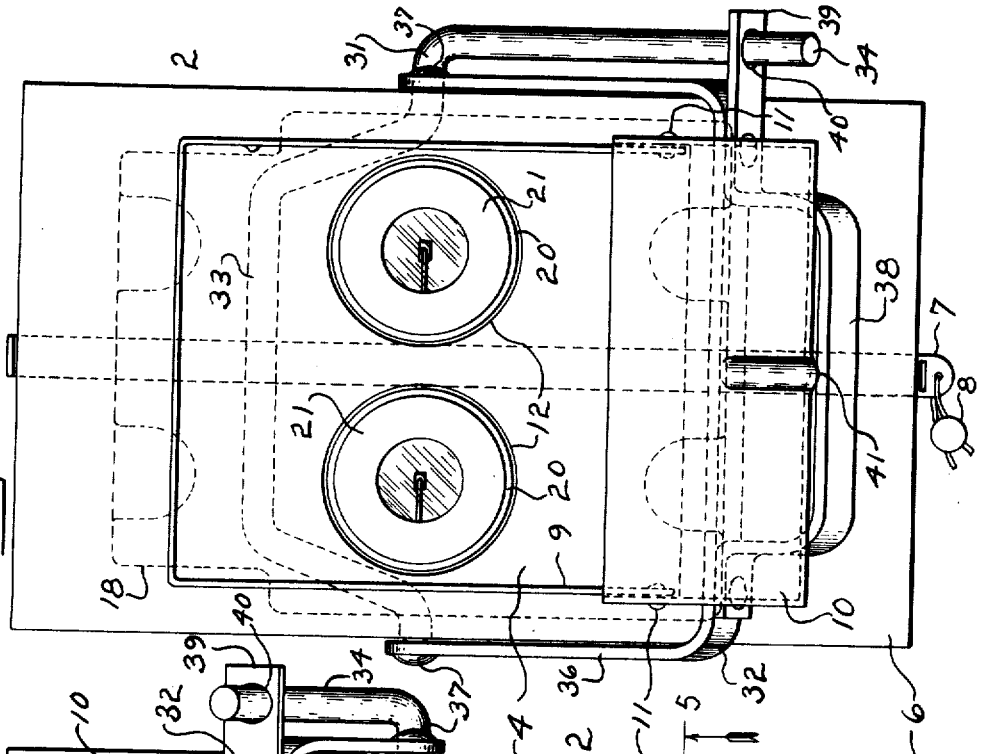
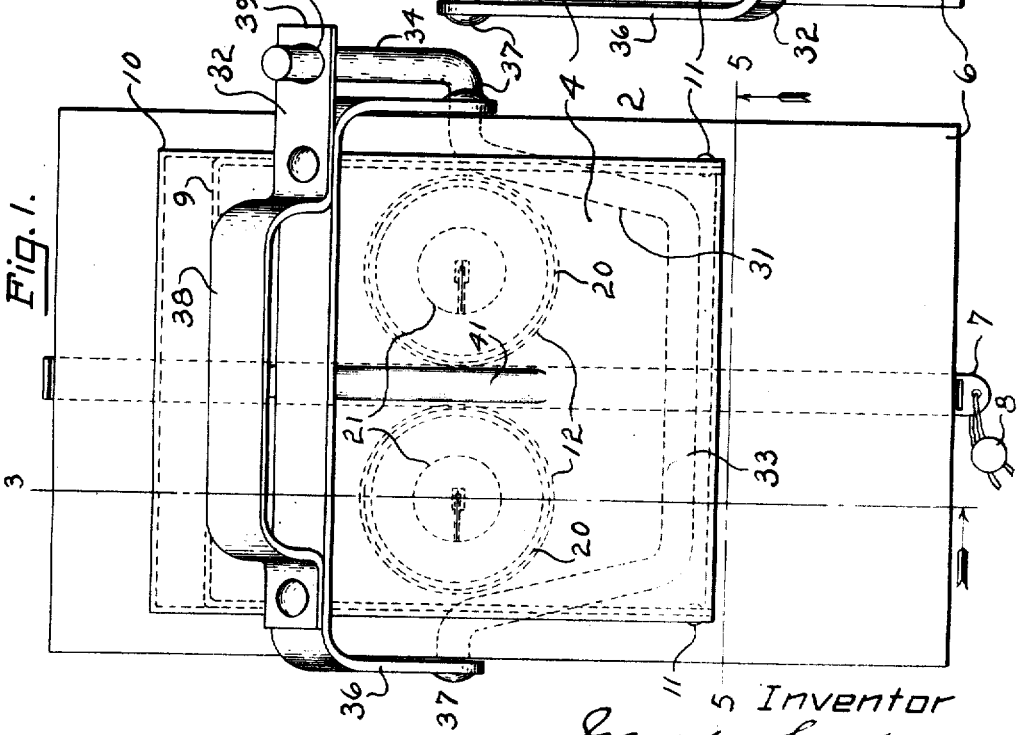
Inventor
Joseph Sachs
By  Attorney J. SACHS.
ELECTRIC SWITCH.
APPLICATION FILED DEC. 19, 1916.
1,294,176.
Patented Feb. 11, 1919.
3 SHEETS—SHEET 2.
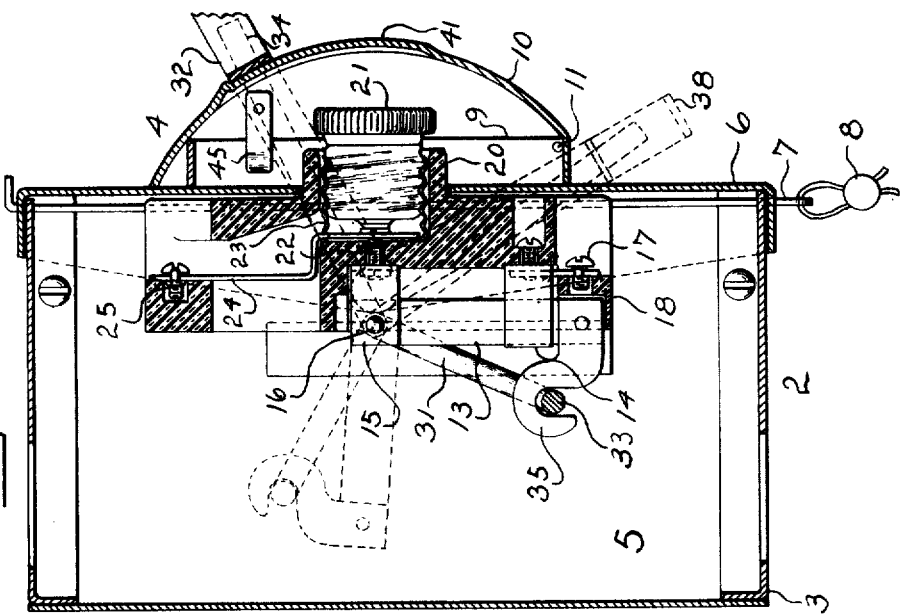
Inventor
Joseph Sachs
By Heath Littlewood
Attorney

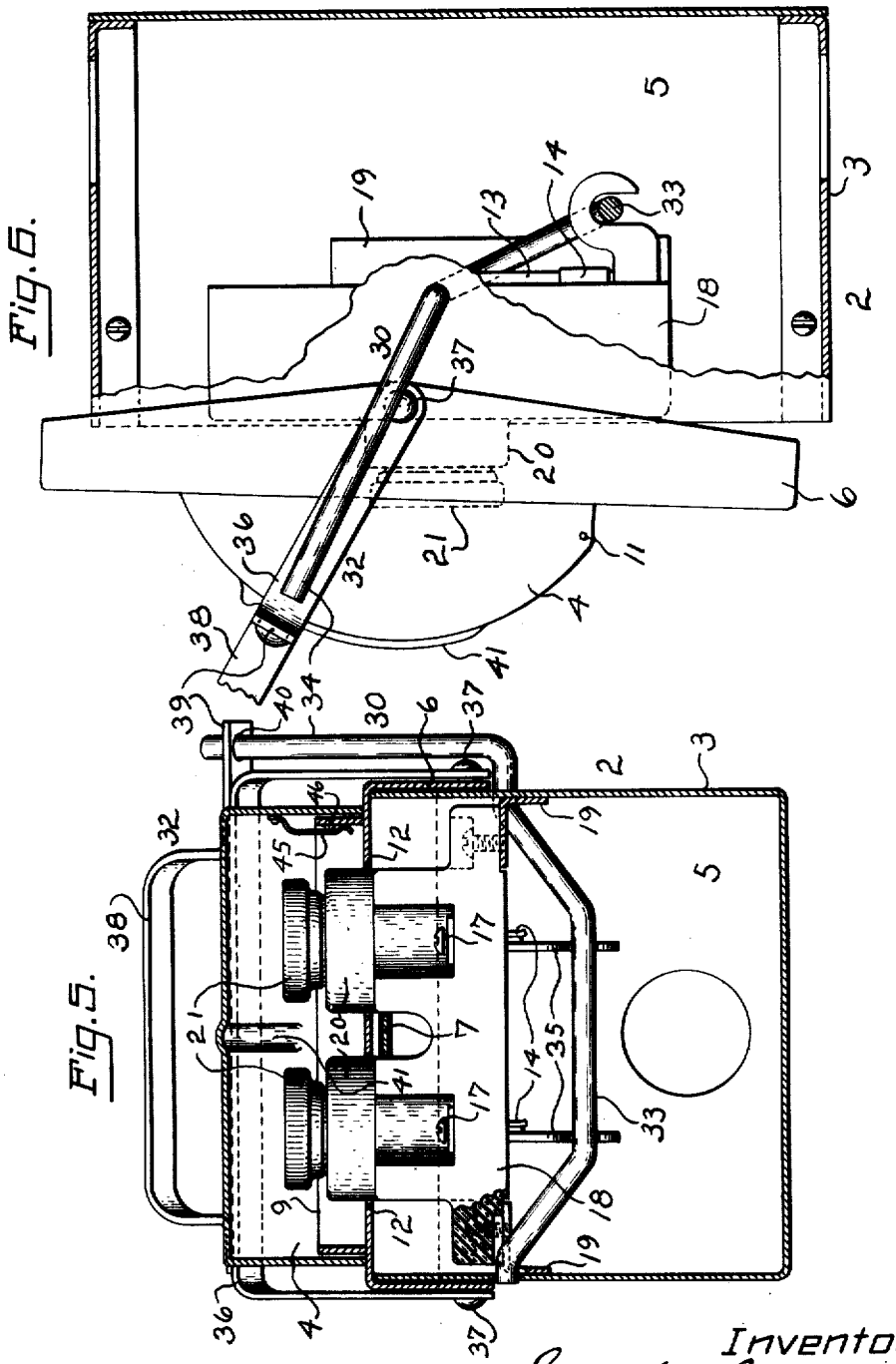

UNITED STATES PATENT OFFICE.

JOSEPH SACHS, OF HARTFORD, CONNECTICUT.

ELECTRIC SWITCH.

1,294,176.     Specification of Letters Patent.     Patented Feb. 11, 1919.

Application filed December 19, 1916. Serial No. 137,782.

*To all whom it may concern:*

Be it known that I, JOSEPH SACHS, a citizen of the United States, residing at Hartford, in the county of Hartford and State of Connecticut, have invented certain new and useful Improvements in Electric Switches, of which the following is a specification.

This invention relates to electric switches. The primary object I have in view is the provision of an appliance of this character possessing the maximum safety. As a result, therefore, it is not inappropriate to consider the appliance a safety electric switch.

Electric switches are at times provided with fusible circuit controlling elements as well as mechanically movable circuit controlling elements both incased, and the movable circuit controlling element being operable from the exterior of the casing. Access to such fused switches is usually had by removing the cover of the box or casing which exposes the various movable and-fusible circuit controlling parts of the appliance and makes them accessible. In this character of switch, however, there is an element of danger to the person who replaces the fuses or must have access to the interior of the casing or box. In my invention I avoid this danger by providing in an electric switch a movable circuit controlling element and its coöperative incoming or supply connections. A fusible circuit controlling element is in coöperative electrical connection with this movable element. Means are provided for inaccessibly incasing the movable circuit controlling element, and separate means are provided for incasing the fusible circuit controlling element. In the present case this incasement is done in a positive manner. To provide for the operation of the movable circuit controlling member exteriorly of the casing an actuator mechanically associable with the movable circuit controlling means is provided. This actuator is coöperatively related with the casing of the fusible circuit controlling element, so that said element is made inaccessible when the actuator is in a position to close through said movable circuit controlling element connection with the supply end connection, and this coöperative relation between the actuator and the casing for the fusible circuit controlling element is such as to permit the opening of this casing and give access to said fusible circuit controlling element when the actuator is in what might be called the open position or has moved the movable circuit controlling element away from or disconnected it from the supply end connection. Furthermore to fully carry out the safety feature of my invention, I so relate and coöperatively arrange the movable and fusible circuit controlling elements, their casings and coöperative mountings, bases, barriers, etc. that when the fusible circuit controlling element has been made accessible in the manner above described, it is positively dead or free from all electrical connection or contact with the supply end connection aforesaid, and this supply end connection and preferably also the movable circuit controlling element is positively barriered, separated, shielded and made surely inaccessible to the manipulator of the fusible circuit controlling device when accessible as noted.

In the drawings accompanying and forming part of the present specification I have shown an organization which has met the requirements in a highly satisfactory manner. This I will set forth in detail in the following description. I do not restrict myself in any sense to this showing; I may depart materially therefrom within the scope of the invention defined by the claims following said description. As a matter of fact the invention involves certain broad relations and is confined in no sense to any particular details.

I have found that an excellent arrangement of the parts or elements entering into my invention is to combine them in a manner so that the movable circuit controlling means is on one side of a support and the fusible circuit controlling means is on the other side, while the cabinet or housing for the entire appliance is of what might be called a multi or plural compartment character. In this structural arrangement the main portion of the cabinet or housing of which a cover is a part, completely supports and incases the live or supply end connection and the movable circuit controlling means, while mounted on this main part of the entire cabinet is the auxiliary casing or inclosure for the fuse. As shown these two inclosures are mounted one in front of or over the other, but as will be entirely obvious, many other locational arrangements of these two compartments or incasings of the complete cabinet may be used.

I also wish to make clear that in the particular structural embodiment of the invention herein shown, all of the circuit controlling parts and elements are supported in and by the main part of the complete cabinet, leaving the cover both for the main part and for the auxiliary or fuse incasing part of the cabinet, entirely free from any mounting or carrier or bases, contacts or other parts entering into the circuit controlling element of the complete appliance. It will be noted also that while I have provided for the incasement and protection and safe-guarding against contact of the live or supply end contacts or connections and the accessibility at certain times and conditions of the fusible circuit controlling means, I have also arranged the parts so that the live connections and the movable circuit controlling element which under normal conditions are positively locked, sealed and barriered against access and contact may yet when desired, be made at once accessible to permit of proper connection, inspection and adjustment.

Referring to the drawings:

Figure 1 is a face view of an electric switch involving the invention with the actuator in the closed position and all parts inaccessible.

Fig. 2 is a similar view with the actuator in open circuited position and the cover of the fusible circuit controlling means incasement or inclosure opened.

Fig. 3 is a vertical section on the line 3—3 of Fig. 1, looking in the direction of the arrows, the dotted lines showing the actuator and the movable circuit controlling means in the open position.

Fig. 4 is a side elevation as seen from the left in Fig. 2, the dotted lines showing the cover of the casing for the fusible circuit controlling means in the closed position.

Fig. 5 is a section on the line 5—5 of Fig. 1, looking in the direction of the arrows.

Fig. 6 is an elevation as seen from the right in Figs. 1 and 2 for example, with the actuator and movable circuit controlling means in the closed position and with the sealing means removed and with the cover of the main casing partly off to provide access to said main casing.

Fig. 7 is a transverse section on the line 7—7 of Fig. 4, looking in the direction of the arrow, showing a catch for the cover of the fusible circuit controlling means casing.

Like characters refer to like parts throughout the several views.

Certain of the parts as will be understood are inclosed by a cabinet. This cabinet so long as it meets certain conditions hereinafter specified, may be of any suitable nature; that denoted in a general way by 2 meets the requirements in a satisfactory manner. This cabinet or its equivalent involves a main casing as 3 and an auxiliary casing as 4. The interior of this main casing or inclosure 3 constitutes a convenient compartment for movable circuit controlling means of some convenient form, while the interior of the auxiliary compartment 4 presents a suitable compartment or chamber for fusible circuit controlling means. The movable circuit controlling means, as will be understood, comprises preferably one or more connectors or switching members of which a suitable kind will be hereinafter described. The fusible circuit controlling means involves one or more fusible elements, the fuses of which may be any one of the familiar types now in general use. The fusible element requires replacement when blown and in the location of the parts and the relation to each other it is essential that at least this destructible fusible element be accessible and manipulable when its inclosing casing is open. However, it is as will appear, not essential that any of the supporting parts for the destructible fusible element be supported or mounted in or for that matter even project into to any extent the aforesaid casing.

In the embodiment of the invention shown, the main casing 3 comprises a box body 5 and a cover 6. In conjunction with this main casing 3 I provide suitable sealing means, and as will be obvious, this sealing means may be of any convenient kind, although that shown and now to be described answers. The box body 5 and cover 6 have slots which register to receive the sealing rod 7 headed at one end and perforated at the other to receive the seal 8. It will be clear that when the cover 6 is sealed, access to the interior of the main casing or box 3 can be obtained only by breaking the seal.

In the present case this cover 6 constitutes a convenient support for the auxiliary casing 4. As represented this auxiliary casing 4 consists of a frame or wall members as 9 rigid with the outer face of the cover, and a cover as 10 hinged or otherwise suitably connected with said wall or frame member or analogous part. A suitable hinge is shown at 11. The cover 6 as shown has apertures or perforations 12 through which the fuses and certain supporting parts therefor project into and are held within the auxiliary casing 4.

As noted there may be one or more suitable movable circuit controlling elements. I have shown two of such and designate them by 13. These movable circuit controlling elements 13 are in the form of connectors or switching members as they are sometimes known, of blade construction for instance. Each is associated and coöperatively related with contacts as 14 and 15. When the movable circuit controlling means are as shown of blade type the contacts may be of clip form of the usual construction as shown. One of each pair of clips coöperating with each respective movable circuit controlling or switching member is arranged for pivotal relationship with one end of the blade as shown at 16, while the other clip 14 is a rupturing portion clip into and out of which the movable blade connector or switching member is moved. In the present case the contacts or clips 14 are preferably connected with the supply end of the circuit, and for this purpose are provided with the usual connecting parts such as shown by 17 for the connection therewith of supply wires.

The two pairs of contacts 14 and 15 are fixed in some convenient manner upon a suitable support, the insulating base 18 being shown for this purpose. This insulating base may be of porcelain or other suitable material; it is mounted in the box body 5 and as shown said box body is provided at suitable places with angle brackets 19 suitably rigidly connected with said body 5 and base 18 respectively.

The movable circuit controlling means is situated on one side of a base as 18 while the fusible circuit controlling means is situated on the opposite side of said base in the construction shown, which is an advantageous arrangement, although I am not restricted thereto. In that form of base shown, the latter has bosses 20 which extend through the apertures or openings 12 in the cover 6. The pockets of these bosses receive the standard Edison screw receptacle shells and contact into which the standard Edison plug fuses 21 are received. These fuses are merely one of several kinds which answer the requirements; any other type may be substituted therefor so long as proper provision is made to properly receive and hold them.

In order to electrically connect the receptacle or receiving contacts for the fuse 21 with the movable switching members 13, I find the construction shown excellently adapted for this purpose. The screws 22, the heads of which serve as the central contacts for the fused plug receptacles, are extended through the base 18 and are mechanically and electrically clamped and connected with the respective hinged end contacts 15. The receptacle screw shells 23 forming the other contacts of the fused plug receiving receptacles, are electrically continued by the strips 24 terminating in suitable wire connecting means as shown at 25 to which the outgoing or load wires may be connected. The screws 22 serve to hold the screw shells 23 and the strips 24 in place in the usual manner common in the art. It will now be noted that when the movable switching members 13 are in closed position electrically connecting the clips 15 and 14 that the circuit from the supply end connected to the connection part 17 extends through the movable connectors or switching members 13 up to the central contacts of the plug receptacles through the fusible plugs to the shells 23, the connecting strips 24 and the circuit connection parts 25 to which the outgoing circuit wires are connected. Consequently as will be clear when the movable switching members are opened then the fuse receptacle contacts are electrically inactive, dead or entirely positively disconnected from the supply end contact and connection represented by the clip 15 and connecting part 17.

The actuator for the complete appliance serves in its entirety for the manipulation or operation of the movable switching member or members within the cabinet from the exterior of the cabinet and preferably also provides by proper coöperative relationship with the fusible circuit controlling device inclosure to produce the already described locking effect of that particular inclosure when the actuator is in certain predetermined positions, the on position. The actuator may be formed in various ways involving in its complete organization a single part or a plurality of parts which may be separable to produce certain advantageous results. This latter arrangement is that which I have adopted in order to obtain certain of the results above stated.

The actuator shown is denoted in a general way by 30. It comprises the parts 31 and 32. The part 31 in turn is made up of a crank portion 33, the ends of which are supported for rocking movement by the sides of the box body 5. One of these gudgeon or journal ends is projected upwardly as denoted by 34, the upwardly projecting portion 34 being connectible and disconnectible as required with the actuator part 32. The yoke or crank portion 33 constitutes in the construction shown the connector or switch member operating part of the actuator and for this purpose it is connected in some convenient way with the two connectors 13. As shown these connectors have united with them the couplers 35 preferably of insulating material and terminating in hooks which receive the yoke or crank portion 33 to thus mechanically connect the actuator in its entirety with the two connectors. The way of coupling these connectors or ones equivalent to them with the actuator does not constitute the subject matter of the present case, but is covered in another application filed by me. The actuator portion 32 is in the form of a bail 36 straddling the cover 6 and pivoted thereto as at 37 at opposite sides of the cover. Attached to this bail is the manipulating handle portion 38 extending from which is the arm 39 which is perforated as at 40 to receive freely the outer terminal portion of the arm or projection 34 which is the normal assemblage when the parts are operatively related to perform their normal circuit controlling functions. By grasping the handle portion 38 and moving it on its pivots the movable switching member portion 31 of the complete actuator is correspondingly moved, so that the movable switching members are placed in open or closed position. In the on position of the complete actuator 30 the bail-like portion with its manipulating handle is in position as shown in Fig. 1, and by the full lines in Fig. 3 and also in Figs. 5 and 6. The open circuited position of the complete actuator is shown in Figs. 2 and 4 and by dotted lines in Fig. 3. It will be noted that the relationship of the actuator with the cover 10 is such that the transverse part of the bail 36 rides directly on the projecting rib 41 of the cover 10, so that this cover as soon as the actuator is moved toward circuit closing position is caused to be pushed into closing position and when the bail-like portion 36 of the actuator is moving in its circuit closing position and after it has concluded its circuit closing movement, this cover is firmly locked and held in place. It will also be noted that for some substantial distance of movement prior to the actual connection of the movable switching members with the stationary rupture portion contact is effected, this cover 10 is closed and lock closed by the bail-like part 36 of the actuator. Also conversely, this cover cannot be opened until the actuator has been moved backward substantially to its full open circuited position.

In order that the cover 10 may be held or latched in closed position, I provide some sort of catch or fastening to hold this cover to the frame member 9. This is shown in detail in Figs. 4 and 7. As represented the cover 10 is furnished with a spring tongue 45 acting as a convenient latch to engage a keeper or nib 46 on the frame or wall member.

In the normal operation of my switch appliance, the main cover 6 will be sealed and held in place on the box body 5. The circuit wires being properly connected as stated, the actuator can now be grasped and moved through its full extent of movement in either direction to open or close the circuit due to the movement of the movable circuit controlling members 13. So long as it is merely required to have the appliance perform this function nothing further need be done. If now a fuse blows and requires replacement and the switch should be on, it is first necessary to move the actuator to the off position, after which the cover 10 may be grasped and opened, having been released by the off movement and positioning of the actuator and its associated switching member or members. Now it is possible to manipulate the fuses 21 which are, however, at this time entirely and positively dead and no part of the fuse plug or its receiving receptacle is in any way connected with the supply end of the circuit. Furthermore the manipulation for removal and reinsertion of a fuse plug is made absolutely safe and the manipulator is insured against all and any danger of contact with live parts due to the fact that it is impossible for him to have access into in any way, the main compartment of the complete cabinet in which the live or incoming circuit connection and the movable switching members controlling connection therewith are located. This safety feature is acomplished by the positive barrier or the complete blocking off of access from the auxiliary or fuse containing compartment to the main or movable switching member and live connection containing compartment.

It is necessary at times for inspection, adjustment and connection to get at the main compartment containing the circuit connections and the movable switching parts. To accomplish this however, it is essential that the seal 8 be broken, and the sealing bar or rod 7 be removed, and this procedure is illustrated in Fig. 6 as has already been stated. When in this condition and the cover 6 and its attached parts have been entirely taken away, then the manipulator has free access through the main compartment and all the live parts connections and movable switching elements therein. Due to the peculiar construction of the cabinet and the actuator, it will be noted that access may be had to the main compartment of the cabinet containing the movable switching member and live connections may be had when the parts are in the on or closed circuited position as well as in the off or open circuited position. This feature is of advantage, because it may be necessary to inspect for testing or other purposes the aforesaid parts and connections without disturbing the circuit connections.

What I claim is:

1. In an electric switch, a cabinet having a compartment, provided with a main cover having an opening, and an auxiliary cover for said opening, a base supported in said compartment independently of said covers, a movable circuit-controlling member on one side of said base and within said compartment, a fusible circuit-controlling portion on the other side of said base, positioned at said opening in the main cover, an operating element for the movable circuit-controlling member, having a portion accessible exteriorly of said cabinet, and means coöperative with the movable circuit-controlling member and its operating element and the auxiliary cover to prevent the latter being opened to give access to the fusible circuit-controlling member when the switch is closed.

2. In an electric switch, a cabinet having a compartment, a main cover with an opening therein, an auxiliary cover for said opening, a fusible switch comprising a base, the switching element being on one side of said base and the fuse receiving portion on the opposite side of said base, said fuse switch being mounted in its entirety in the compartment and closing the opening in said main cover so that the fuse-carrying portion is positioned at said opening and is accessible when the auxiliary cover is opened, an operating member for said switching element, having a portion accessible exteriorly of the cabinet, said switch-operating member coöperating with the auxiliary cover to prevent the latter being opened when the switch is closed.

3. In an incased switch, a fused switch comprising a base, movable circuit-controlling means mounted on one side of said base and a fusible circuit-controlling means receiving portion on the opposite side of said base, a cabinet having a main cover with an opening, an auxiliary cover for closing said opening, means for mounting said fuse-switch in said cabinet so that the movable circuit-controlling means is entirely within the cabinet and the portion carrying the fusible circuit-controlling means is positioned at the opening in the main cover, operating means for the movable circuit-controlling means, having a portion accessible exteriorly of the cabinet, and means coöperative between said operating means and said auxiliary cover to prevent access to the fusible circuit-controlling means when the switch is closed.

4. In an electric switch, a box provided with a main cover portion having an opening, an auxiliary cover over said opening, a fuse switch comprising a base with a movable switching member mounted on one side of said base and a fuse-receiving portion on the other side of said base, the fused switch being positioned with its switching member entirely within the box and its main and auxiliary cover portions and with its fused-receiving portion at the opening in the main cover portion, an operating element for the switching member having a portion accessible exteriorly of the cabinet, means operable when the cover portions are in place on the cabinet, to prevent access to the fuse-receiving portion of the fuse-switch when the switching member is closed, and means whereby said cover portions may both be moved out of their normal position on the cabinet to give complete access to all parts of said switch.

5. In an electric switch, a box, a cover for the box, the cover having an opening, means for sealing the cover in its closed position on the box, a fused switch in the box and supported independently of the cover, the fuse-switch closing said opening and the fuse-carrying portion being positioned at said opening in the cover so that when the cover is in place access to the other parts of the fuse-switch within the box and its cover is prevented, a supplementary cover preventing when closed, access to the fuse-carrying portion, a switch-operating element having a portion accessible exteriorly of said box, and means to prevent the opening of the auxiliary cover when the switch is closed.

6. In an electric switch, a base having a switching member mounted on one face and a fuse-receiving portion mounted on the opposite face, a box having means for completely inclosing the switching member while permitting access to the fuse-receiving portion exteriorly of said box, an auxiliary cover for said exteriorly accessible fuse-receiving portion, a switch-operating element, and means coöperating between the switch-operating element and the auxiliary cover, to prevent the opening of the latter when the switch is closed.

7. In an electric switch, a box, a removable cover for the box, the cover having an opening, a fuse-switch in said box and supported independently of the cover, the fuse-switch closing said opening and the fuse-carrying portion of said fuse-switch being positioned at said opening, a supplementary cover to prevent when closed access to the fuse and the fuse-carrying portion of said fuse-switch, and a switch-operating member accessible exteriorly of said box, the switch-operating member having means coöperative therewith and the supplementary cover to prevent the latter being opened when the switch is closed.

8. In an electric switch, a box, a cover for the box, the cover having an opening, a fused switch comprising a base, a switching member positioned on one side and a fuse-receiving portion on the opposite side, said base being supported in the box independently of the cover, the base of the switch closing said opening and the fuse-carrying portion being positioned at said opening; a supplementary cover to prevent when closed access to the fuse-carrying portion for manipulation of the fuse, a switch-operating member operatively connected with the switching element, mounted on the base of the fuse-switch in the box, said switch-operating member having a portion accessible exteriorly of the box, and said switch-operating element being provided with means to engage the cover to prevent the same being opened when the switch is closed.

9. In an electric switch a box, a removable cover for the box, the cover having an opening, a fuse-switch in said box, supported independently of the cover, the fuse-switch closing said opening, and the fuse-carrying portion of said fuse-switch being positioned at said opening, means accessible exteriorly of the box for opening and closing the switch, and means for preventing access to the fuse-carrying portion of the switch when the latter is on and for permitting access to said fuse-carrying portion when the switch is off.

10. A box, a fused switch in the box, the body of the switch being supported by a fixed part of the box, means accessible exteriorly of the box to open or close the switch independently of the movement of any movable part of the box, the box having an opening to provide access to the fused portion of the switch without opening the box and means for preventing access to the fuse of the switch except when the switch is open.

11. In a device of the character described, a box having a cover, a switching member in said box and inaccessible when said cover is closed, means accessible exteriorly of the box for effecting the action of the switching member independently of the movement of any movable part of the box, fuse-receiving means in the box and electrically associated with the switching member, said box having an opening and said fuse-receiving means being positioned at said opening to provide for the mounting and dismounting of a fuse without opening the box, and means for permitting access to the fuse-receiving portion only when said fuse-receiving contacts are dead.

12. In a device of the class described, a box, a switch in the box comprising an insulating base, fuse receiving means on one face of the base, movable switching means on the opposite face of the base and within the box, the switching means and the fuse receiving means being approximately in overlapped relation, and a support in the box for said fuse switch to expose the fuse receiving portion of the switch outwardly of the box.

In testimony whereof I affix my signature in the presence of two witnesses.

JOSEPH SACHS.

Witnesses:
L. L. MARKEL,
HEATH SUTHERLAND.